UNITED STATES PATENT OFFICE.

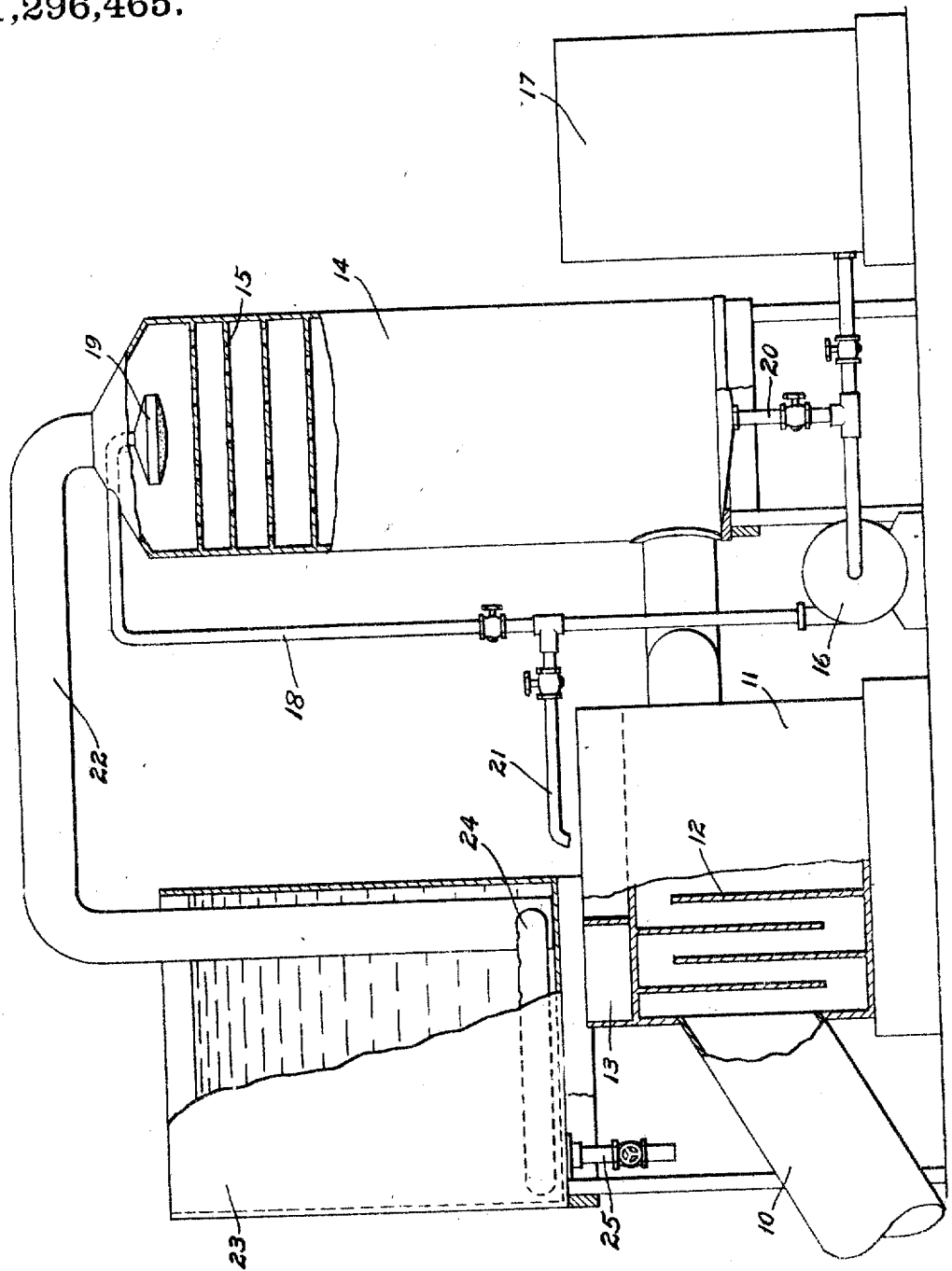

HENRY BLUMENBERG, JR., OF ORO GRANDE, CALIFORNIA, ASSIGNOR TO CHEMICAL CONSTRUCTION COMPANY, OF LOS ANGELES, CALIFORNIA, A CORPORATION OF CALIFORNIA.

PROCESS OF TREATING CEMENT-KILN GASES.

1,296,465. Specification of Letters Patent. Patented Mar. 4, 1919.

Application filed April 24, 1918. Serial No. 230,577.

*To all whom it may concern:*

Be it known that I, HENRY BLUMENBERG, Jr., a citizen of the United States, residing at Oro Grande, in the county of San Bernardino and State of California, have invented new and useful Improvements in Processes of Treating Cement-Kiln Gases, of which the following is a specification.

My invention relates to a process of recovering potassium compounds from the waste gases of cement kilns, metallurgical furnaces and the like.

Potash, at the present time, may be obtained as a by-product of Portland cement. Potassium containing raw materials which are otherwise suitable for making cement are fed into the cement kilns where the high temperature volatilizes the potassium in the form of potassium oxid $K_2O$, which is carried off in the waste gases. Various methods and devices are used for the extraction and recovery of the potassium oxid from the waste gases. In several of my copending applications, I have described apparatus and methods for the extraction of the potassium oxid from the waste gases, which briefly consist in checking the velocity of the gases by cooling the same, thereby precipitating the larger portion of the cement dust carried therein and contacting the gases at a considerably lower temperature and free of the major portion of its solid contents, with a liquid or magma having an affinity for carbon dioxid and potassium oxid carried by the gases. While a substantially complete recovery of all potassium oxids may be obtained by these processes and apparatus, it is essential that the gases be caused to contact with the liquid or magma just referred to for a sufficient length of time for a complete recovery of the potassium oxid.

It is an object of the present invention to simplify the method of extracting potassium oxid and reduce the time factor, whereby greater volumes of gases may be treated.

Another object of this invention is to utilize the great quantities of carbon dioxid carried by these gases in the production of a commercial article.

My invention consists in the steps of the process hereinafter described and claimed.

In the accompanying drawings which form a part of this specification, I have illustrated diagrammatically an apparatus suitable for carrying out my process.

Referring to the drawings, 10 indicates the upper end of a rotary cement kiln communicating with a series of dust collecting chambers 11 provided with baffle walls 12. 13 designates evaporating pans forming the top of the dust collecting chambers 11. 14 is a baffle tower provided with suitable baffles 15. 16 is a pump for circulating a liquid from tank 17 through pipe 18 to a spraying nozzle 19 at the upper end of the baffle tower 14. A return pipe 20 leads from the bottom of the baffle tower 14 to the pump 16. A pipe 21 leads from the pump 16 to the evaporating tanks 13. A conduit 22 leads from the baffle tower 14 to a carbonation tank 23. The conduit 22 terminates in a coil of perforated pipe 24 disposed at the bottom of tank 23. 25 is a valve controlled outlet pipe leading from tank 23.

In the operation of my process, the hot waste gases coming from the cement kiln 10 pass through the dust collecting and cooling chamber 13 where the velocity of the gases is checked due to the contraction of the volume through the cooling of the gases and the greater portion of the cement dust is deposited. The gases pass next through the baffle tower 14 and the same are brought in contact with a liquid or magma sprayed from the spraying nozzle 19. The liquid used in the baffle tower may be water, an alkaline aqueous mixture containing sodium potassium aluminum silicates made by fusing feldspar and sodium salt, sodium chlorid, an aqueous mixture of a sulfate of an alkali metal or alkaline earth metal, or sodium nitrate, and the like. The same is repeatedly circulated through the baffle tower 14 until sufficiently enriched with a potassium compound and calcium carbonate, and is then pumped to the evaporating pans 13. The gases leaving the baffle tower 14 contain carbon dioxid, nitrogen, small quantities of oxygen and carbon monoxid and the remaining portion of the potassium oxid. The same now pass through the carbonation tank 23 which is filled with a solution of sodium carbonate. The carbon dioxid will combine with the sodium carbonate to form sodium bicarbonate and the remaining portion of the potassium oxid will be recovered in the form of potassium bicarbonate. The carbonate solutions in tank 23 are then conducted to suitable concentrating tanks, (not shown) where the sodium bicarbonate is separated from the potassium bicarbonate by crystallization. The solubility of the potassium bicarbonate as compared with that of the sodium bicarbonate is as 11 to 4.

The process just described not only recovers all the potassium oxid carried in the hot gases in a rapid manner without the necessity of providing high baffle towers or a series of them, and at the same time utilizes the carbon dioxid hitherto allowed to go to waste. At the cement mill at Oro Grande, California, eighty tons of carbon dioxid are liberated every twenty-four hours with one ton of $K_2O$ and about ten tons of cement dust. Making allowance for the carbonation of the cement dust in the apparatus, there is still about seventy tons of carbon dioxid in the gases. While it is true that in the ammonia process of making sodium carbonate, sodium bicarbonate is formed as an intermediate product which is subsequently calcined to form the soda ash of commerce, the cost of soda ash and bicarbonate of soda in the market is about the same. However, two thousand pounds of soda ash converted into sodium bicarbonate yields about twenty nine hundred pounds, thus increasing the value of the soda ash almost 50%, less the operating expenses.

In place of the soda ash, lead oxid may be used in the carbonation tank 23, which may be converted into basic lead carbonate or white lead or any other compound may be used having an affinity for carbon dioxid and which, when carbonated, yields a marketable product.

I claim:

1. A process of recovering potassium compounds from the hot gases of cement kilns and the like, comprising cooling said gases and precipitating the larger portion of the cement dust, treating said gases with a suitable liquid for extracting the remainder of the cement dust and a portion of the potassium compounds, and passing said gases through a solution of sodium carbonate, where the remainder of the potassium compounds is absorbed, thereby forming sodium bicarbonate and potassium bicarbonate, and separating the potassium bicarbonate from the sodium bicarbonate.

2. A process of recovering potassium compounds from the hot gases of cement kilns and the like, comprising cooling said gases and precipitating the larger portion of the cement dust, treating said gases with a suitable liquid for extracting the remainder of the cement dust and a portion of the potassium compounds, and passing said gases through an aqueous mixture containing a compound having an affinity for carbon dioxid, where the remainder of the potassium compounds is absorbed, thereby forming a carbonate with the base of said compound and potassium bicarbonate, and separating the potassium bicarbonate from the mixture.

In testimony whereof I have signed my name to this specification.

HENRY BLUMENBERG, Jr.